(12) United States Patent
Darr

(10) Patent No.: US 7,448,904 B2
(45) Date of Patent: Nov. 11, 2008

(54) LOW-PROFILE POWER SUPPLY TERMINAL ASSEMBLY

(75) Inventor: Matthew R. Darr, Godfrey, IL (US)

(73) Assignee: Cooper Technologies Company, Houston, TX (US)

( * ) Notice: Subject to any disclaimer, the term of this patent is extended or adjusted under 35 U.S.C. 154(b) by 41 days.

(21) Appl. No.: 11/586,844

(22) Filed: Oct. 26, 2006

(65) Prior Publication Data

US 2008/0102691 A1    May 1, 2008

(51) Int. Cl.
*H01R 3/00* (2006.01)
(52) U.S. Cl. ........................... 439/500; 429/96; 429/100

(58) Field of Classification Search ................. 439/500; 429/96, 100
See application file for complete search history.

(56) References Cited

U.S. PATENT DOCUMENTS

| 4,992,987 | A | 2/1991 | Echols et al. |
| 6,109,530 | A | 8/2000 | Larson et al. |
| 6,527,584 | B2 * | 3/2003 | Ninomiya .................... 439/500 |
| 6,722,916 | B2 * | 4/2004 | Buccinna et al. ............. 439/500 |
| 6,890,682 | B2 * | 5/2005 | Takahashi et al. ............. 429/97 |

* cited by examiner

*Primary Examiner*—Tho D Ta
(74) *Attorney, Agent, or Firm*—Armstrong Teasdale LLP

(57) ABSTRACT

A low-profile power supply terminal assembly is provided.

29 Claims, 7 Drawing Sheets

LOW-PROFILE POWER SUPPLY TERMINAL ASSEMBLY

BACKGROUND OF THE INVENTION

This invention relates in general to electronic devices, and more particularly to power supply terminal assemblies for electronic devices having an on-board power supply.

Electronic devices require a power supply, and often it is desirable for a power supply to be on-board the electronic device. An example of a power supply that may be located on-board an electronic device is a battery, and a variety of battery-powered electronic devices are known. Battery holders are widely used in such devices to provide an electrical connection between a battery and electrical components of the device. Increasing miniaturization of electronic devices requires increasingly miniaturized batteries. The proper installation and replacement of batteries in such devices is challenging.

For example, low-profile batteries are now available that are disk-shaped with positive and negative terminals located on opposing major surfaces of the disk. For many users, the positive and negative terminals are not easily distinguished, and the battery or batteries may be inadvertently installed upside-down. Batteries installed incorrectly may result in a non-operational or malfunctioning device. This is particularly problematic for passive devices that do not require continuous functionality of the device because it may not be apparent to the user that the electronic device is not properly functioning. Further, improperly installed batteries may damage circuit boards and associated components if the improperly installed batteries create a reverse current flow in the device.

DETAILED DESCRIPTION OF THE INVENTION

Embodiments of the present invention provide a low-profile power supply terminal assembly that overcomes these and other disadvantages known in the art. In an exemplary embodiment this is achieved at least in part by providing a positive terminal and a negative terminal, wherein at least one of the terminals is configured such that an improperly installed battery will not complete an electrical connection to the battery when it is installed improperly, thereby preventing damage to and impaired functionality of an electronic device.

In order to appreciate the invention to its fullest extent, the following disclosure will be divided into different parts or segments, wherein Part I discusses particular problems known in the art in an exemplary electronic device and Part II discloses exemplary embodiments of a power supply terminal assembly overcoming the problems and disadvantages discussed in Part I.

I. INTRODUCTION TO THE INVENTION

Figure 1:
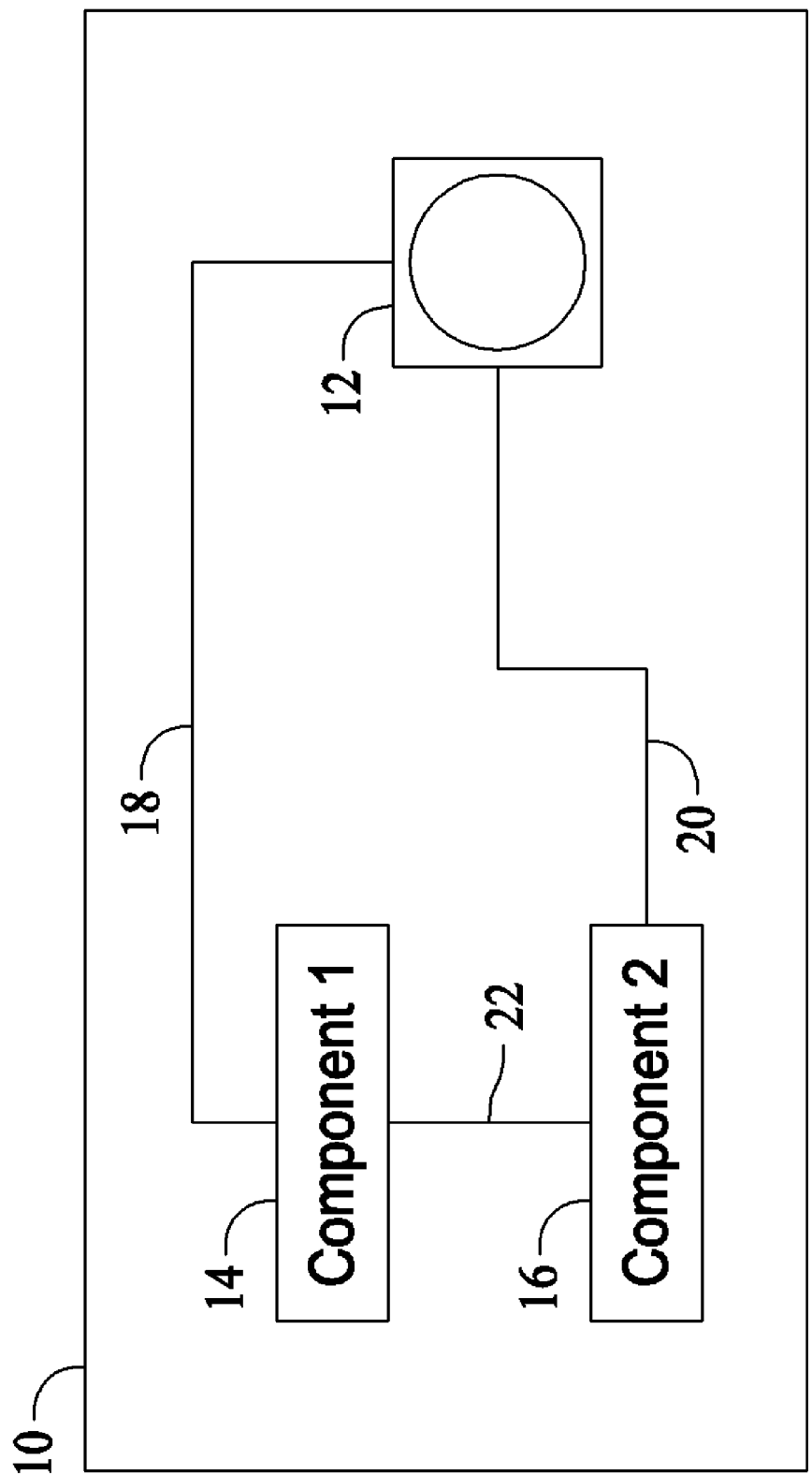
FIG. 1 is a schematic block diagram of an exemplary electronic device.

Referring now to the figures, FIG. 1 is a schematic block diagram of an exemplary electronic device 10 having an on-board power supply in which the benefits of the invention may be explained. The electronic device 10 may be particularly advantageous when configured as a monitoring module of a circuit protector, such as an overcurrent protection fuse as explained below. The invention, however, is not considered to be strictly limited to any particular application or end use, and the invention may likewise be beneficial for other electronic devices, including but not limited to cellular phones, wristwatches and timers, monitoring devices for various purposes, personal music players and systems, voice recorders and messaging systems, pager systems, musical instrument interface devices, a personal digital assistant (PDA) device or other electronic device, or still other electronic device having a self-contained on-board power supply.

As shown in FIG. 1, the device 10 includes a power supply 12, a first component 14, and a second component 16. The power supply 12 includes a first terminal connection 18 and a second terminal connection 20. The first terminal connection 18 may connect the power supply 12 to the first component 14, and the second terminal connection 20 may connect the power supply 12 to the second component 16. The first component 14 and the second component 16 may be electrically connected, for example, by a connector or a circuit trace 22. The first component 14 may be a microprocessor or controller and the second component 16 may be, for example, a transmitter. However, the first component 14 and the second component 16 may be other electronic components in other embodiments including but not limited to, a microcontroller, a memory unit, and an input/output device such as a display unit, a speaker, a light emitting diode, or a touch screen. The device 10 may include more or less components than illustrated in FIG. 1.

The power supply 12 may be, in various exemplary embodiments, a capacitor, a power harvesting device, a low-profile battery or other device capable of storing and discharging electrical power to the device. When the power supply 12 is in place, a circuit including the power supply 12, the first component 14, the second component 16, the first terminal connection 18, the second terminal connection 20, and the connector 22 is completed.

In order for many electronic devices having such on-board power supplies, and more specifically the circuitry within these electronic devices, to function properly, the power supply must be properly installed. Proper installation of a battery, for example, includes providing a connection between a positive terminal of the battery and a positive side of an electric circuit, and a negative terminal of the battery and a negative side of an electric circuit. Electric circuits are typically designed to operate with current flowing in a specific direction. Proper installation of the battery provides the proper difference in potential and therefore provides the proper direction of current flow. If a battery is installed with the battery incorrectly connected to the device, a reverse current flow may result, which may cause damage to the device.

Certain electronic devices may not immediately indicate to a user whether an on-board power supply is properly or improperly installed, or whether the device is functioning or not functioning. For example, a battery may be inserted into a monitoring device that is configured to alert a user to the occurrence of an event. However, that monitoring device may not provide any indication of proper functionality unless the battery is properly installed and that event occurs. Therefore, if a battery is improperly installed in such a device, and the device is damaged by the improper installation, the user may not know that the battery was improperly installed. Furthermore, if the device is damaged by the improper installation and the event occurs that the device was monitoring, the user may not receive an indication of that occurrence. Such instances may be particularly problematic in a fuse monitoring application for an electrical system having a large number of fuses. Proper operation of monitoring modules for fuses is essential to identify opened fuses for replacement.

II. EXEMPLARY EMBODIMENTS OF THE INVENTION

Figure 2:
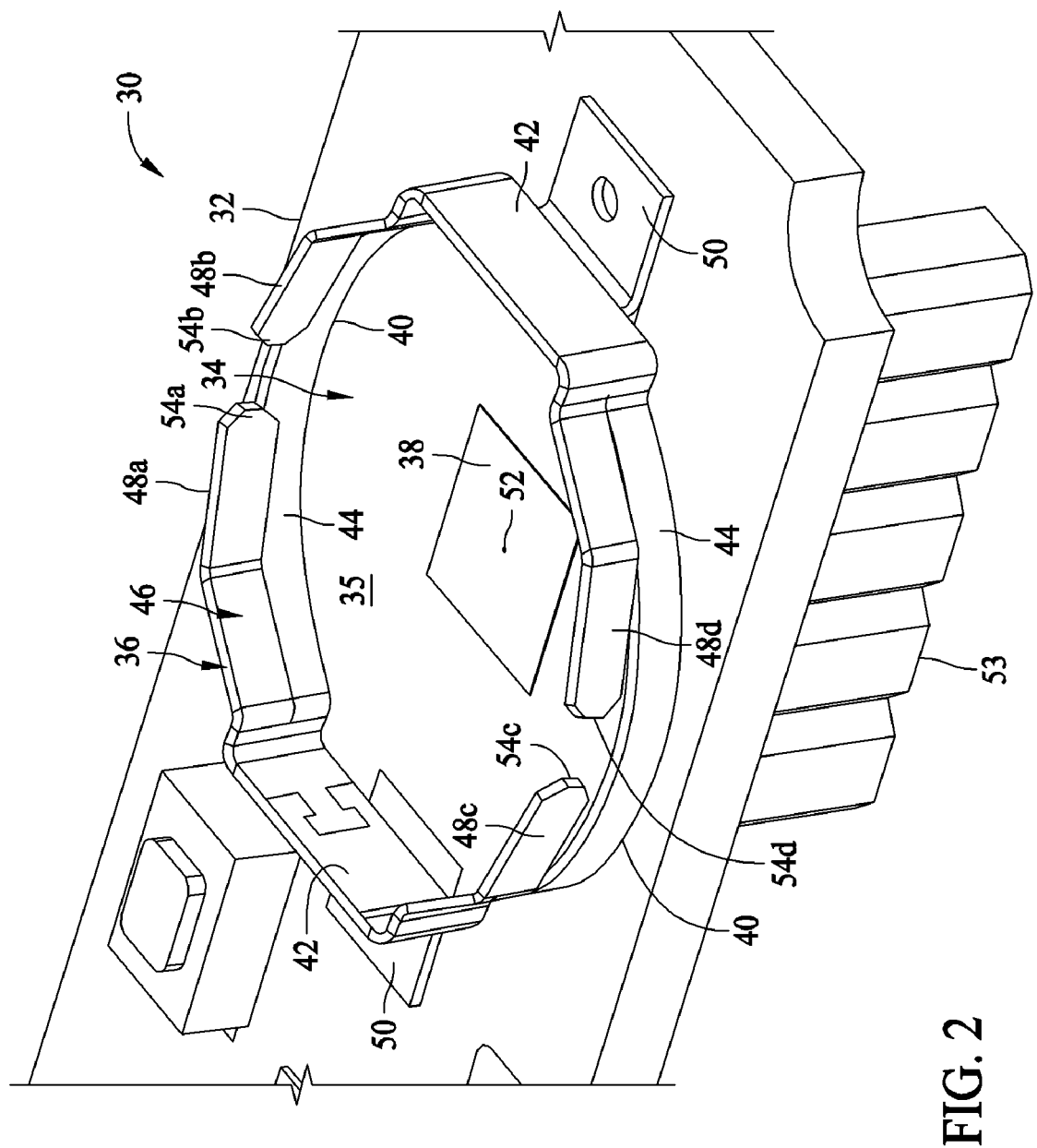
FIG. 2 is a perspective view of an exemplary power supply terminal assembly.

FIG. 2 is a perspective view of an exemplary power supply terminal assembly 30 for the electronic device 10 shown in FIG. 1. The assembly 30 may include an insulative body 32 defining a site 34 configured to receive a power supply, such as the power supply 12 shown in FIG. 1. The body 32 may be, for example, a circuit board material or another known insulating material such as plastic. The site 34 may be located on the surface of the body 32 as shown in FIG. 2, or alternatively may be recessed relative to the surface of the body 32 as in a compartment or cavity formed into the body 32.

A positive terminal 36 and a negative terminal 38 are located at the site 34 for connection to the power supply as explained below. The positive terminal 36 may include opposed and upstanding side walls 40 and opposing end walls 42 interconnecting the side walls 40.

The side walls 40 may include a receptacle portion 44 and a terminal contact portion 46. The receptacle portions 44 define a compartment or receptacle at the site 34 to receive and contain the power supply. The receptacle portions 44 of the side walls 40 may be curved as shown in FIG. 2, and more specifically may be substantially circular so as to extend circumferentially around the power supply when installed. The side walls 40 may therefore securely surround and contain the power supply.

The terminal contact portions 46 of the side walls extend above the receptacle portions 46 and include deflectable contact tabs 48a, 48b, 48c and 48d arranged in opposing pairs to one another. As explained below, the tabs 48a, 48b, 48c and 48d extend to a corresponding terminal of the power supply only when it is properly installed. The plurality of contact tabs 48a, 48b, 48c and 48d provide multiple and redundant points of contact with the power supply. While four contact tabs 48 are illustrated in FIG. 1, it is contemplated that greater or fewer numbers of contact tabs may be provided in an alternative embodiment.

The end walls 42, unlike the generally curved side walls 40, may be generally flat and rectangular, and each end wall 42 may include a footing 50 that provides for connection to the body 32 with a known fastener such as a screw, a rivet, an adhesive, or by another attachment technique known in the art to physically secure the terminal 36 to the body 32.

The positive terminal 36 may be stamped, shaped or otherwise formed from a sheet of conductive material, such as a copper or copper alloy sheet in one embodiment, according to known techniques. While the positive terminal 36 is formed into a generally symmetrical shape in the illustrated embodiment, the positive terminal may be formed into an asymmetrical shape if desired. The particular shape and form of the positive terminal 36 illustrated in the figures is but one example, and it is contemplated that other shapes and forms may alternatively by employed in other embodiments of the invention.

The negative terminal 38 may be provided at a location between the side walls 40 of the positive terminal 36. That is, in an exemplary embodiment, the negative terminal 38 may be located between the opposed side walls 40 of the positive terminal 36, such that positive terminal 36 generally surrounds the negative terminal 38. In one embodiment, the negative terminal 38 may be a solder pad or contact pad on a printed circuit board, while in an other embodiment the negative terminal 38 may be stamped, shaped or otherwise formed into a freestanding body of conductive material.

In one embodiment, the negative terminal 38 is located centrally within the side walls 40 of the positive terminal 36, such that the negative terminal 38 is located generally at a center point 52 of the positive terminal 36. In another embodiment, the negative terminal 38 may be off centered with respect to the positive terminal 36.

Also, in an exemplary embodiment, distal ends 54a, 54b, 54c 54d of the respective contact tabs 48 are positioned closer to the center point 52 than the remainder of the side walls 40.

As used herein, a "low-profile" power supply is a power supply device capable of being placed on-board an electronic device and having a first dimension that is substantially smaller than a second and third dimension in an orthogonal coordinate system. That is, considering a Cartesian coordinate system having axes x, y, and z, the x axis may correspond to the length of the power supply, the y axis may correspond to the width of the power supply, and the z axis may correspond to the height or thickness of the power supply. Batteries, are known, for example that have a thickness dimension that is much less than the length or width dimensions of the batteries. Additionally, the thickness is typically relatively small, being measured in millimeters.

Some batteries meeting this criteria are sometimes referred to as coin batteries due to their resemblance in overall shape to currency coins, such as a dime, for example. Such batteries may be provided in a disc-shaped or coin-shaped package having a diameter, corresponding to the length and width dimensions, of about 25 mm and a thickness dimension of about 5 mm or less. The small thickness dimension provides a low-profile height, measured from a surface of a circuit board for example, of the battery when installed in the electronic device. The side walls 40 of the positive terminal 36 may accordingly have a height approximately equal to a height of the power supply when installed.

Figure 3:
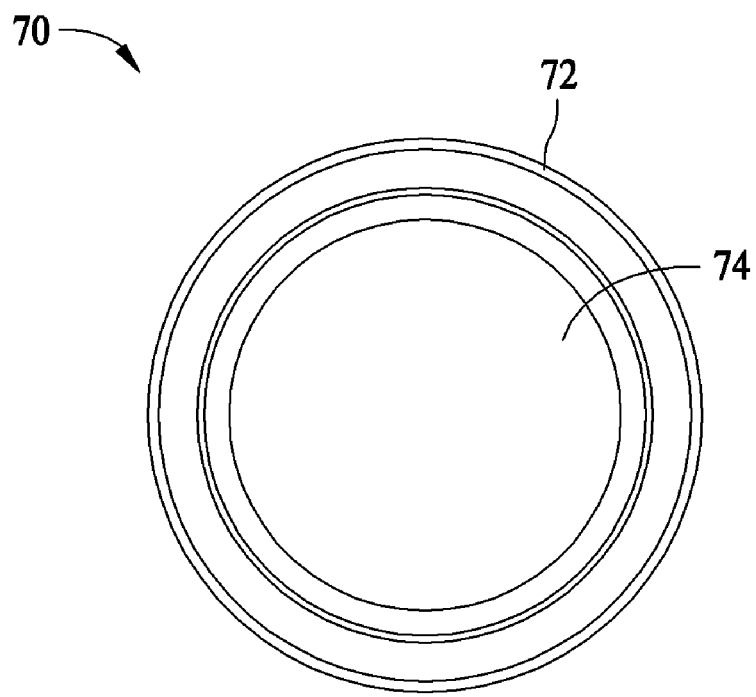
FIG. 3 is a top plan view of an exemplary power supply.
Figure 4:
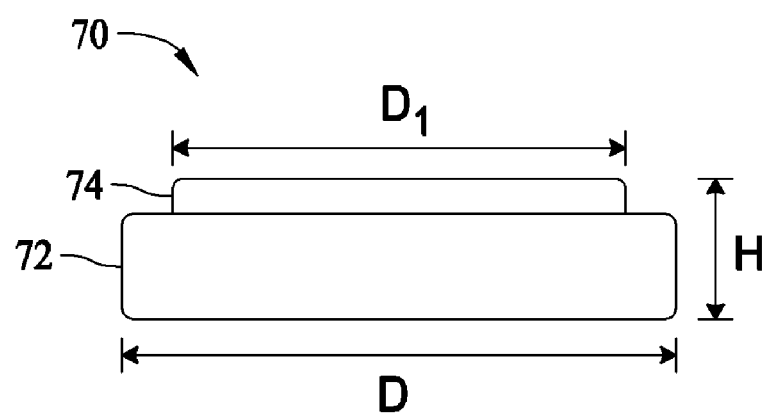
FIG. 4 is side view of the power supply shown in FIG. 3.

FIGS. 3 and 4 are a top plan view, and side view, respectively, of an exemplary low-profile battery 70 that may be utilized as the power source for the assembly 30. In particular, the battery 70 may be a BR1225 Poly-carbonmonofluoride Lithium Coin Battery, manufactured by Panasonic Corporation of Secaucus, N.J. having an overall thickness or height H of about 2.5 mm, and an overall diameter D of about 12.5 mm. The battery 70 may include a positive terminal 72 and a negative terminal 74. The terminals 72 and 74 of the battery may be concentric, and in an exemplary embodiment the positive terminal may have a diameter D that is larger than a diameter $D_1$ of the negative terminal 74. The battery 70 may be connected to an electronic device using the terminal assembly 30 such that the difference in potential between the positive terminal 72 and the negative terminal 74 causes a current to flow through the electronic device.

Figure 5:
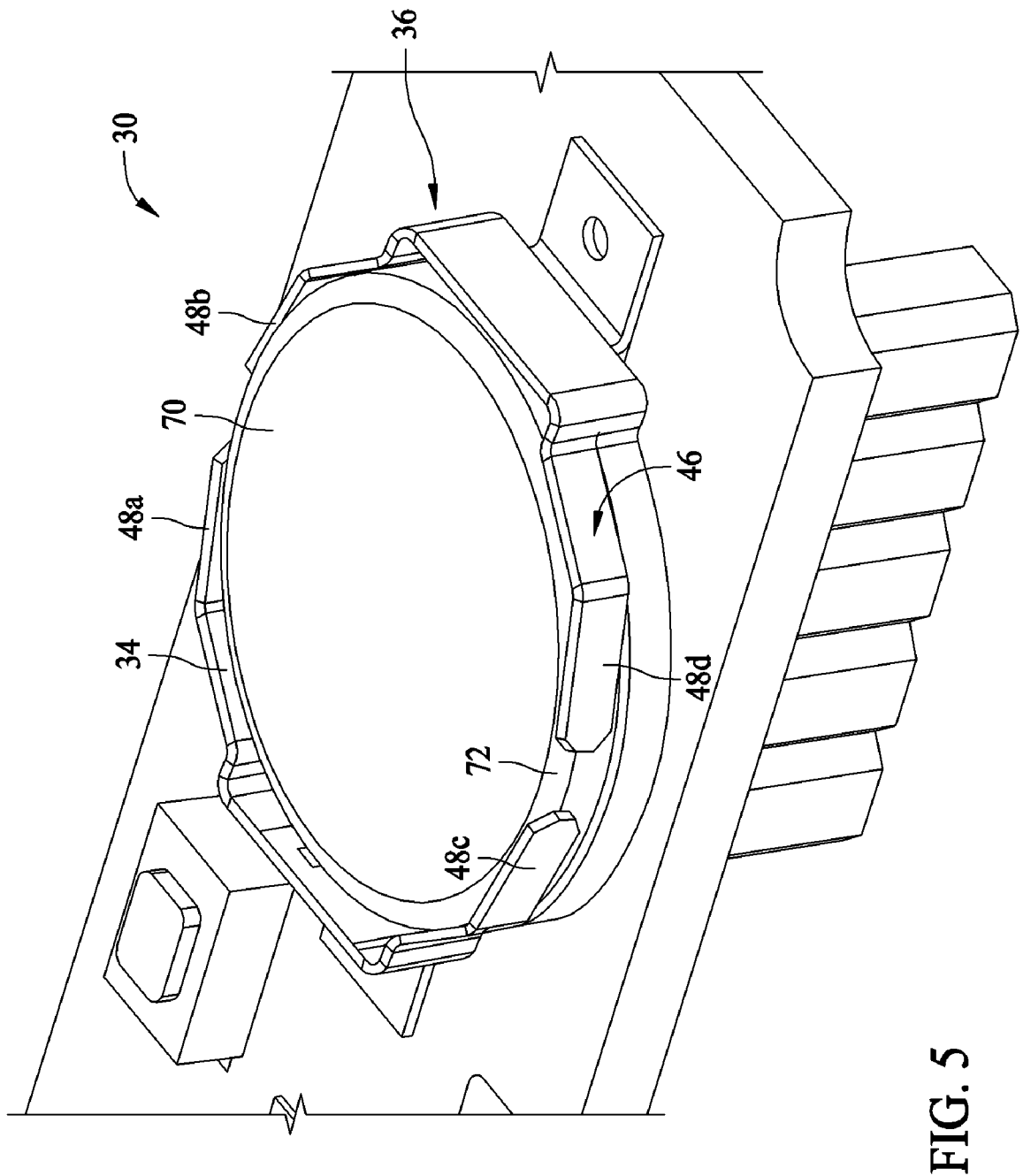
FIG. 5 is a perspective view of the terminal assembly including the power supply properly installed.
Figure 6:
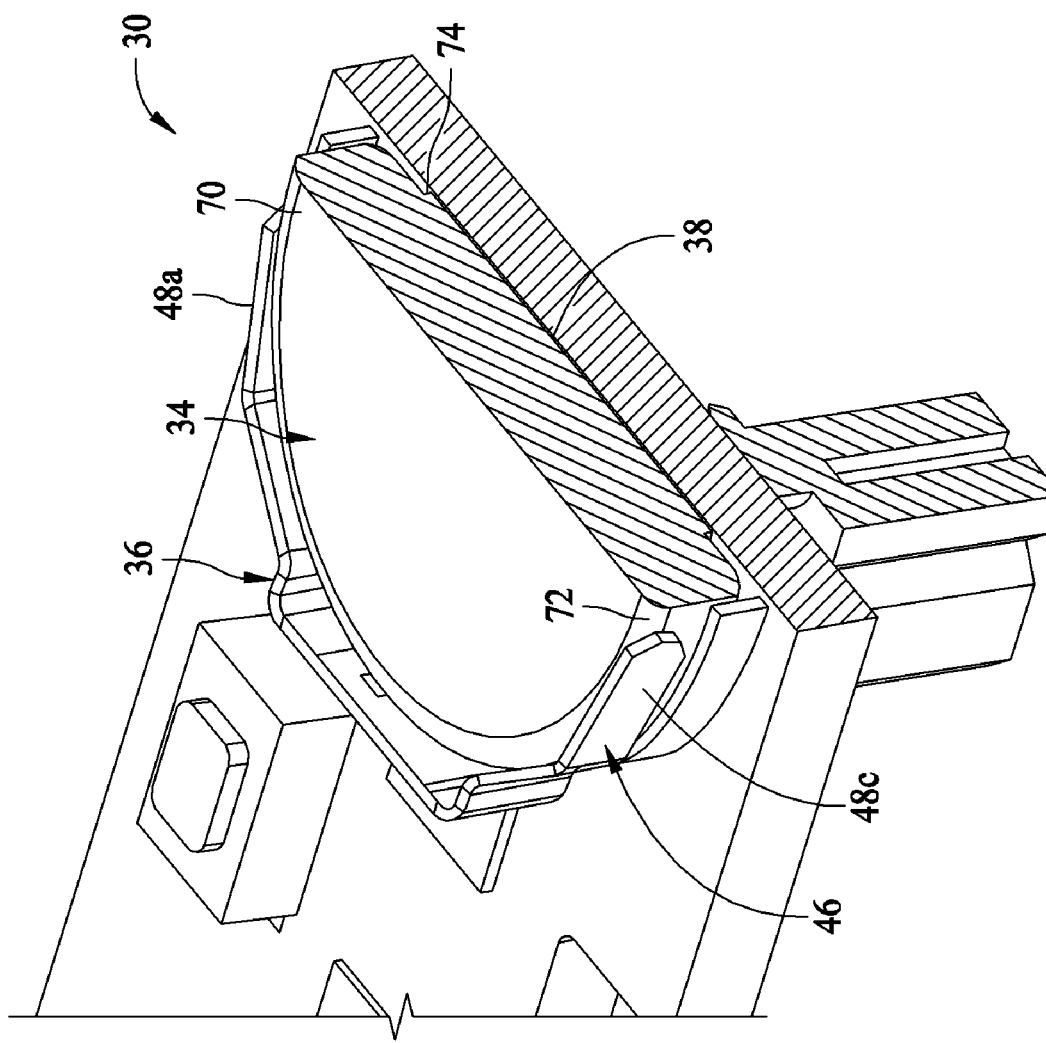
FIG. 6 is a sectional view of the assembly shown in FIG. 5.

FIGS. 5 and 6 illustrate the low-profile battery 70 properly installed in the terminal assembly 30. The deflectable contact tabs 48a, 48b, 48c and 48d of the positive terminal 36 are in mechanical and electric contact with portions of the positive battery terminal 72 when the battery 70 is received in the site 34. Deflection of the tabs 48 as the battery 70 is installed results in a normal force contact or slight pressure on the terminal 72 to ensure electrical connection to the terminal 72. Also, the negative battery terminal 74 is in mechanical and electrical contact with the negative terminal 38. As such, the polarity of the battery 70 with respect to the terminal assembly 30 is proper and the battery 70 completes a circuit in the electronic device with the terminal assembly 30 providing a conductive path or connection between the positive terminal 36 and the negative terminal 38.

Due to the relatively small size of the battery 70 and its terminals 72 and 74, the terminals 72 and 74 may not be readily distinguishable to a casual user, and the battery 70 is therefore amenable to being installed with reverse polarity in the terminal assembly 30. That is, instead of being installed right side up with the proper polarity, the battery may be installed upside down in the terminal assembly 30 with reverse polarity. In a reverse polarity installation, the positive terminal 72 of the battery 70 is placed in contact with the negative terminal 38. The terminal assembly 30 will accept the battery in either of the two orientations with equal ease. That is, the terminal assembly 30 will accept battery in the proper or right side up orientation with the proper polarity, in the improper or upside down installation with reverse polarity. Because of the construction of the terminal 36 as explained below, however, the battery 70 will only complete the circuit in the terminal assembly 30 when the battery is properly installed.

Figure 7:
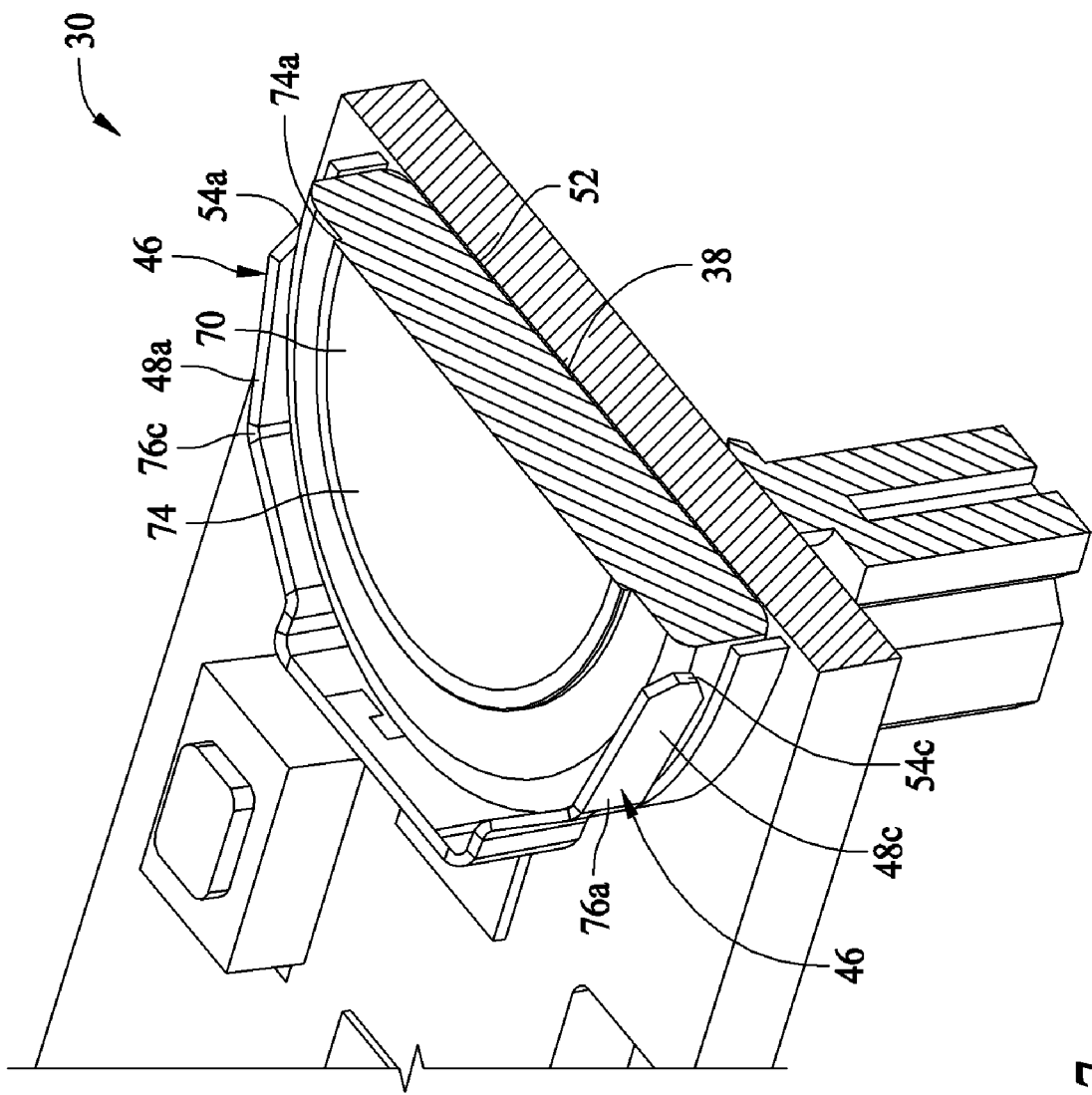
FIG. 7 is a sectional view similar to FIG. 6, but with the power supply improperly installed.

FIG. 7 is a sectional view of the battery 70 when improperly installed within the site 34 of the terminal assembly 30. As shown in FIG. 7, the positive battery terminal 72 is in communication with the negative terminal 38 of the assembly 30. However, the tabs 48*a* and 48*c* fail to extend inwardly a sufficient distance to make contact with the negative battery terminal 74. The distal ends 54*a*, 54*c* of the tabs 48*a* and 48*c* are positioned far enough from the center 52 of the site 34 that the tabs 48 do not reach the negative terminal 74. An edge 74*a* of the negative battery terminal 74 is closer to the center point 52 than an edge 72*a* of the positive battery terminal 72, preventing a connection from forming between the positive and negative terminals 72 and 74 when the battery 70 is improperly installed. In other words, the distal ends 54*a*, 54*c* of the tabs 48*a*, 48*c* extend inwardly from the terminal side walls 40 toward the center point 52 a distance from the proximal end 76*a*, 76*c* of each tab that is sufficient to contact the battery terminal 72 when it is properly installed, but insufficient to contact the battery terminal 74 when it is improperly installed. Stated another way, the distal ends 54*a*, 54*c* of the tabs 48*a*, 48*c* are positioned a radial distance from the center point 52 that is farther than the radial distance from the center point 52 to the edge 74*a* of the negative battery terminal 74. Also, the proximal ends 76*a*, 76*b* of the tabs 48*a*, 48*b* are positioned a radial distance from the center point 52 that is larger than the radial distance from the center point 52 to the distal ends 48*a*, 48*c* of the tabs 48.

By not completing a circuit with an improperly installed battery 70, the risk of damage to the circuit or device when installing or replacing the damage is reduced. The terminal assembly 30 is polarity sensitive and will only complete a connection to the battery 70 when it is properly installed. While the assembly 30 has been described with an exemplary polarity, it is understood that the polarity of the terminals 36 and 38 in the assembly 30 may be effectively reversed. That is, the terminal 36 may be used as a negative terminal and the terminal 38 may be used as a positive terminal with the same effect. Additionally, the positive and negative terminals 72, 74 of the battery may also be reversed if desired while achieving essentially the same effect of only completing electrical connection to the battery when properly installed.

Figure 8:
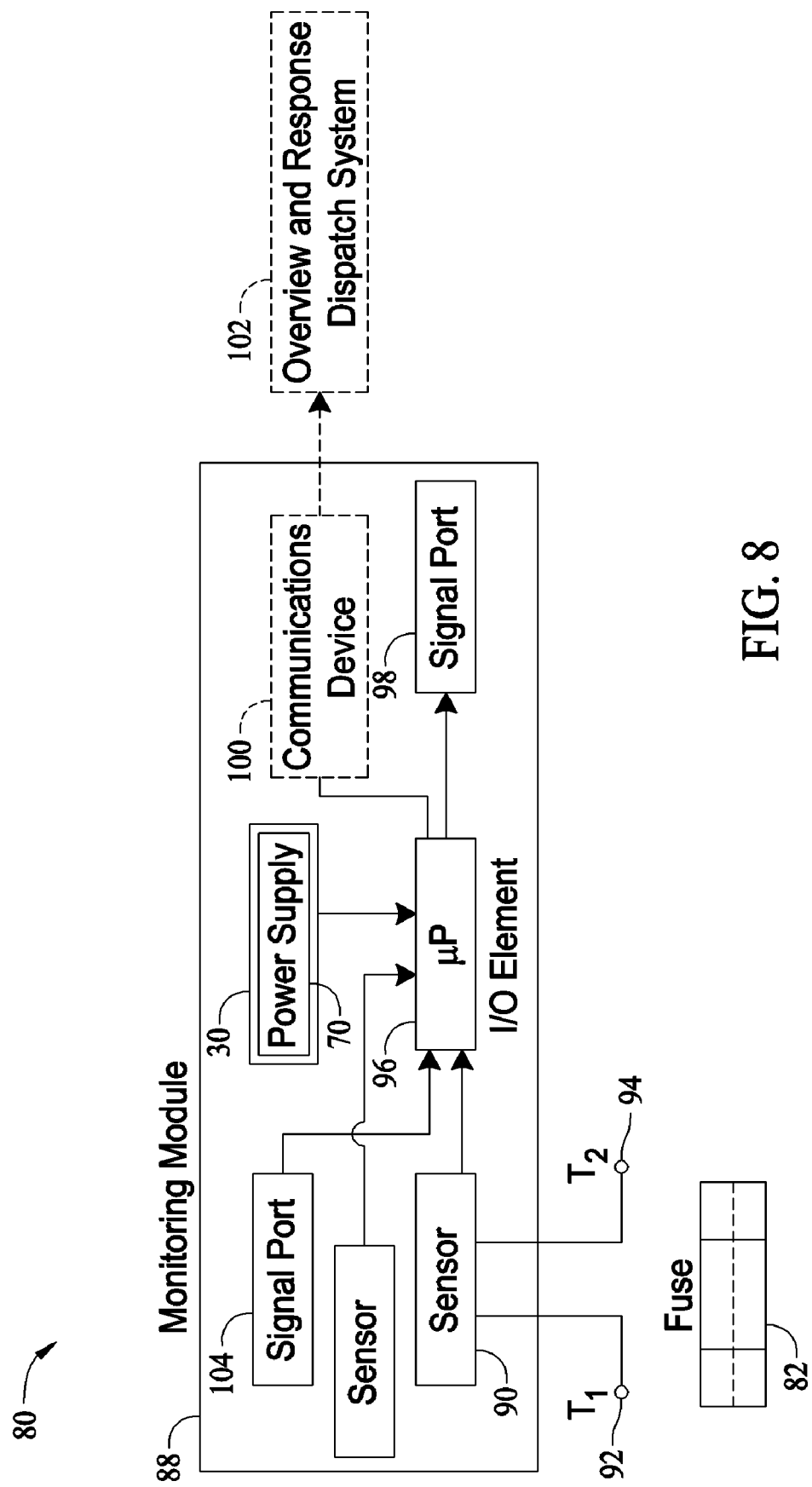
FIG. 8 is a schematic diagram of an exemplary circuit protector monitoring system utilizing the power supply terminal assembly of the invention.

FIG. 8 illustrates an exemplary embodiment of an electronic device in which the benefits of the invention are notable. More specifically, FIG. 8 illustrates a monitoring module 80 of a circuit protector 82, such as an overcurrent protection fuse. The monitoring module 80 may include a power supply in the form of the low-profile battery 70 and the power supply terminal assembly 30 described above. The terminal assembly 30 prevents damage to the module 80 that may not be easily detected by the user after the battery is installed.

The monitoring module 80 may include a sensor board 88 located in a housing (not shown in FIG. 8). The sensor board 88 may include a sensor 90 that monitors operating conditions of contact members 92 and 94 and outputs a signal to an input/output element 96 powered by the on-board power supply 70. When predetermined operating conditions are detected with the sensor 90, such as the opening of a fuse element within the fuse 82, the input/output element 96 outputs a signal to an output signal port 98 or alternatively to a communications device 100 that wirelessly communicates with a remotely located overview and response dispatch system 102 that alerts, notifies, and summons maintenance personnel or responsible technicians to respond to tripping and opened fuse conditions to restore or re-energize associated circuitry with minimal downtime. An indefinite, and perhaps, substantial period of time may elapse, however, before any given fuse opens in a circuit, so a damaged or malfunctioning monitoring module 80 may not be evident to the user when installing a replacement battery because the module 80 is generally passive until the fuse opens. If the module 80 fails to communicate properly with the remote system 102 because of damage or impaired functionality attributable to an incorrectly installed battery, the ability of the remote system 102 to properly identify opened fuses for replacement may be compromised.

Optionally, an input signal port 104 may be included in the monitoring module 80. The input signal port 104 may be interconnected with an output signal port 98 of another monitoring module 80, such that signals from multiple monitoring modules may be daisy chained together to a single communications device 100 for transmission to the remote system 102. Interface plugs (not shown) may be used to interconnect one monitoring module to another in an electrical system. When the modules 80 are interconnected, damage or impaired functionality associated with incorrect battery installation in one of the modules may affect connected modules and impair proper operation of the remote system 102 to identify opened fuses for immediate replacement.

Further details of the monitoring module 80, its communication with the remote system 102, and response and operation of the system remote system 102 are disclosed in commonly owned U.S. patent application Ser. No. 11/223,385 filed Sep. 9, 2005 and entitled Circuit Protector Monitoring Assembly, Kit and Method, the entire disclosure of which is hereby incorporated by reference in its entirety.

III. CONCLUSION

Various embodiments of terminal assemblies and devices have been described which are believed to amply demonstrate the advantages of the invention.

An embodiment of a terminal assembly is provided herein. The assembly comprises a body comprising a site configured to receive a low-profile power supply in at least a first orientation and a second orientation; and a first terminal and a second terminal at the site for connection to the power supply, wherein a connection is completed through the power supply to both the first and second terminals only when the power supply is positioned in the first orientation.

Optionally, one of the first and second terminals may comprise opposing side walls, the side walls defining a receptacle for the low-profile power supply. The side walls may further comprise at least one tab configured to provide an electrical connection to the power supply in the first orientation. The side walls may be curved, and may have a height approximately equal to a height of the power supply. The second terminal may be located between the side walls. The body may include a base, and the second terminal may be located on the base. The second terminal may comprise a solder pad, and the body may comprise a circuit board. The power supply may comprise a coin battery.

An embodiment of a terminal assembly for a low-profile power supply having a positive terminal and a negative terminal is also described herein. The assembly comprises: a body comprising a site configured to receive a low-profile power supply in each of a proper orientation and an improper orientation; and a positive terminal and a negative terminal at the site for connection to the power supply, wherein the positive terminal extends to and completes an electrical connection to the positive terminal of the power supply when the power supply is received in the site in the proper orientation. The positive terminal does not extend to the negative terminal of the power supply when the power supply is received in the site in the improper orientation.

Optionally, the positive terminal may comprise opposing side walls, the side walls defining a receptacle to contain the power supply. The positive terminal may be configured to receive a coin battery, and the positive terminal may comprise opposing side walls, with at least one of the side walls comprising a contact tab extending inwardly from the side wall. The side walls may have a height approximately equal to a height of the power supply. The positive terminal may comprise a curved side wall extending circumferentially about the power supply when received in each of the proper and improper orientation. The body may include a base and the negative terminal may be located on the base. The negative terminal may comprise a solder pad. The negative terminal may be located between the side walls.

Another embodiment of a power supply terminal assembly is also disclosed herein. The terminal assembly is for a low-profile power supply, and the assembly comprises a terminal comprising curved side walls configured to receive the power supply. The side walls comprise a contact section including at least one tab, with the at least one tab configured to provide an electrical connection between a first terminal of the power supply and a device. The tab comprises a proximal end and a distal end, with the distal end being positioned a first distance from a center point of the terminal, and the proximal end being positioned a second distance from the center point. The second distance is greater than the first distance.

Optionally, the side walls may be substantially circular. The terminal may have a height approximately equal to a height of the power supply. The tab may extend linearly from the curved side walls, and the side walls may be configured to receive a coin battery.

An embodiment of an electronic device is also described herein. The device comprises a low-profile power supply having opposed concentric positive and negative terminals; at least one component powered by the power supply; a body comprising a site configured to receive a low-profile power supply in at least a first orientation and a second orientation; a first terminal located on the body; and a second terminal located on the body. The second terminal is configured to complete an electrical connection between the positive and negative terminals only when the power supply is received in the second terminal in the first orientation.

Optionally, the device may be one of a cellular phone, a wristwatch, a timer, a monitoring device, a personal music player, a voice recorder, a pager system, a musical instrument interface device, and a personal digital assistant device. The component may be one of a processor, a controller, a transmitter, a memory unit, an input/output device, a display unit, a speaker, a light emitting diode, and a touch screen. The second terminal may comprises opposed curved walls, and the second terminal may surround the first terminal. The first terminal comprises a contact pad, and the body may comprise a circuit board. The positive terminal of the power supply may have a first diameter and the negative terminal of the power supply may have a second diameter, with the second terminal comprising side walls defining a receptacle and a contact tab extending inwardly into the receptacle for a distance sufficient to connect to the positive terminal of the power supply in the first orientation, and with the distance being insufficient to connect to the negative terminal when the power supply is in the second orientation. The power supply may be a battery.

While the invention has been described in terms of various specific embodiments, those skilled in the art will recognize that the invention can be practiced with modification within the spirit and scope of the claims.

What is claimed is:

1. A terminal assembly comprising:
   a body comprising a site comprising a first terminal and a second terminal, the site configured to receive a low-profile power supply in at least a first orientation and a second orientation;
   wherein a connection is completed through the low-profile power supply to both the first terminal and the second terminal only when the low-profile power supply is positioned in the first orientation; and
   wherein the first terminal comprises opposing side walls, and the second terminal is located between the opposing side walls.

2. The terminal assembly of claim 1, wherein the opposing side walls define a receptacle for the low-profile power supply.

3. The terminal assembly of claim 1, wherein the opposing side walls further comprise at least one tab configured to provide an electrical connection to the low-profile power supply in the first orientation.

4. The terminal assembly of claim 1, wherein the opposing side walls have a height approximately equal to a height of the low-profile power supply.

5. The terminal assembly of claim 1, wherein the site includes a base, the second terminal being located on the base.

6. The terminal assembly of claim 1, wherein the second terminal comprises a solder pad.

7. The terminal assembly of claim 1, wherein the site comprises a circuit board.

8. The terminal assembly of claim 1, wherein opposing sidewalls are curved.

9. The terminal assembly of claim 1, wherein the power supply comprises a coin battery.

10. A terminal assembly for a low-profile power supply having a positive terminal and a negative terminal, the assembly comprising:

a body comprising a site comprising a positive terminal and a negative terminal, the site configured to receive a low-profile power supply in each of a proper orientation and an improper orientation;

wherein the positive terminal extends to and completes an electrical connection to the positive terminal of the low-profile power supply when the low-profile power supply is received in the site in the proper orientation;

wherein the positive terminal does not extend to the negative terminal of the low-profile power supply when the low-profile power supply is received in the site in the improper orientation; and wherein the positive terminal comprises opposing side walls, the opposing side walls defining a receptacle to contain the low-profile power supply.

11. The terminal assembly of claim 10, at least one of the opposing side walls comprising a contact tab extending inwardly from the at least one of the opposing side walls.

12. The terminal assembly of claim 10, the opposing side walls having a height approximately equal to a height of the low-profile power supply.

13. The terminal assembly of claim 10, wherein the site includes a base and the negative terminal is located on the base.

14. The terminal assembly of claim 10, wherein the negative terminal comprises a solder pad.

15. The terminal assembly of claim 10, wherein the positive terminal is configured to receive a coin battery.

16. A terminal assembly for a low-profile power supply having a positive terminal and a negative terminal, the assembly comprising:

a body comprising a site comprising a positive terminal and a negative terminal, the site configured to receive a low-profile power supply in each of a proper orientation and an improper orientation;

wherein the positive terminal extends to and completes an electrical connection to the positive terminal of the low-profile power supply when the low-profile power supply is received in the site in the proper orientation;

wherein the positive terminal does not extend to the negative terminal of the low-profile power supply when the low-profile power supply is received in the site in the improper orientation; and wherein the positive terminal comprises opposing side walls, and the negative terminal is located between the opposing side walls.

17. A terminal assembly for a low-profile power supply having a positive terminal and a negative terminal, the assembly comprising:

a body comprising a site comprising a positive terminal and negative terminal, the site configured to receive a low-profile power supply in each of a proper orientation and an improper orientation;

wherein the positive terminal extends to and completes an electrical connection to the positive terminal of the low-profile power supply when the low-profile power supply is received in the site in the proper orientation;

wherein the positive terminal does not extend to the negative terminal of the low-profile power supply when the low-profile power supply is received in the site in the improper orientation; and wherein the positive terminal comprises a curved side wall extending circumferentially about the low-profile power supply when received in each of the proper orientation and the improper orientation.

18. A power supply terminal assembly for a low-profile power supply, the assembly comprising:

a terminal comprising curved side walls configured to receive the low-profile power supply, the curved side walls being substantially circular and comprising a contact section including at least one tab, the at least one tab configured to provide an electrical connection between a first terminal of the low-profile power supply and a device, the at least one tab comprising a proximal end and a distal end, the distal end being positioned a first distance from a center point of the terminal, and the proximal end of the at least one tab is positioned a second distance from the center point, the second distance being greater than the first distance.

19. The power supply terminal assembly of claim 18, wherein the terminal has a height approximately equal to a height of the low-profile power supply.

20. The power supply terminal assembly of claim 18, wherein the at least one tab extends linearly from the curved side walls.

21. The power supply terminal assembly of claim 18, wherein the curved side walls are configured to receive a coin battery.

22. An electronic device comprising:
a low-profile power supply having opposed concentric positive and negative terminals;
at least one component powered by the low-profile power supply;
a body comprising a site configured to receive the low-profile power supply in at least a first orientation and a second orientation;
a first terminal located on the body; and
a second terminal located on the body, the second terminal configured to complete an electrical connection between the opposed concentric positive and negative terminals only when the low-profile power supply is received in the second terminal in the first orientation, wherein the second terminal surrounds the first terminal.

23. The electronic device of claim 22, wherein the electronic device is one of a cellular phone, a wristwatch, a timer, a monitoring device, a personal music player, a voice recorder, a pager system, a musical instrument interface device, and a personal digital assistant device.

24. The electronic device of claim 22, wherein the at least one component is one of a processor, a controller, a transmitter, a memory unit, an input/output device, a display unit, a speaker, a light emitting diode, and a touch screen.

25. The electronic device of claim 22, wherein the low-profile power supply is a battery.

26. The electronic device of claim 22, wherein the second terminal comprises opposed curved walls.

27. The electronic device of claim 22, wherein the first terminal comprises a contact pad.

28. The electronic device of claim 22, wherein the body comprises a circuit board.

29. The electronic device of claim 22, wherein the opposed concentric positive terminal of the low-profile power supply has a first diameter and the opposed concentric negative terminal of the low-profile power supply has a second diameter, the second terminal comprising side walls defining a receptacle and a contact tab extending inwardly into the receptacle for a distance sufficient to connect to the opposed concentric positive terminal of the low-profile power supply in the first orientation, the distance being insufficient to connect to the opposed concentric negative terminal when the low-profile power supply is in the second orientation.

* * * * *